Dec. 27, 1960 R. D. McCOY 2,966,641

VARIABLE TIME DELAY APPARATUS

Filed March 3, 1958 2 Sheets-Sheet 1

INVENTOR.
Rawley D. McCoy
BY
B. H. Spencer
AGENT

INVENTOR.
Rawley D. McCoy
BY
B. H. Spencer
AGENT

United States Patent Office 2,966,641 Patented Dec. 27, 1960

2,966,641

VARIABLE TIME DELAY APPARATUS

Rawley D. McCoy, Bronxville, N.Y., assignor to Reeves Instrument Corporation, Garden City, N.Y., a corporation of New York Filed Mar. 3, 1958, Ser. No. 718,835

15 Claims. (Cl. 333—29)

Figure 1:
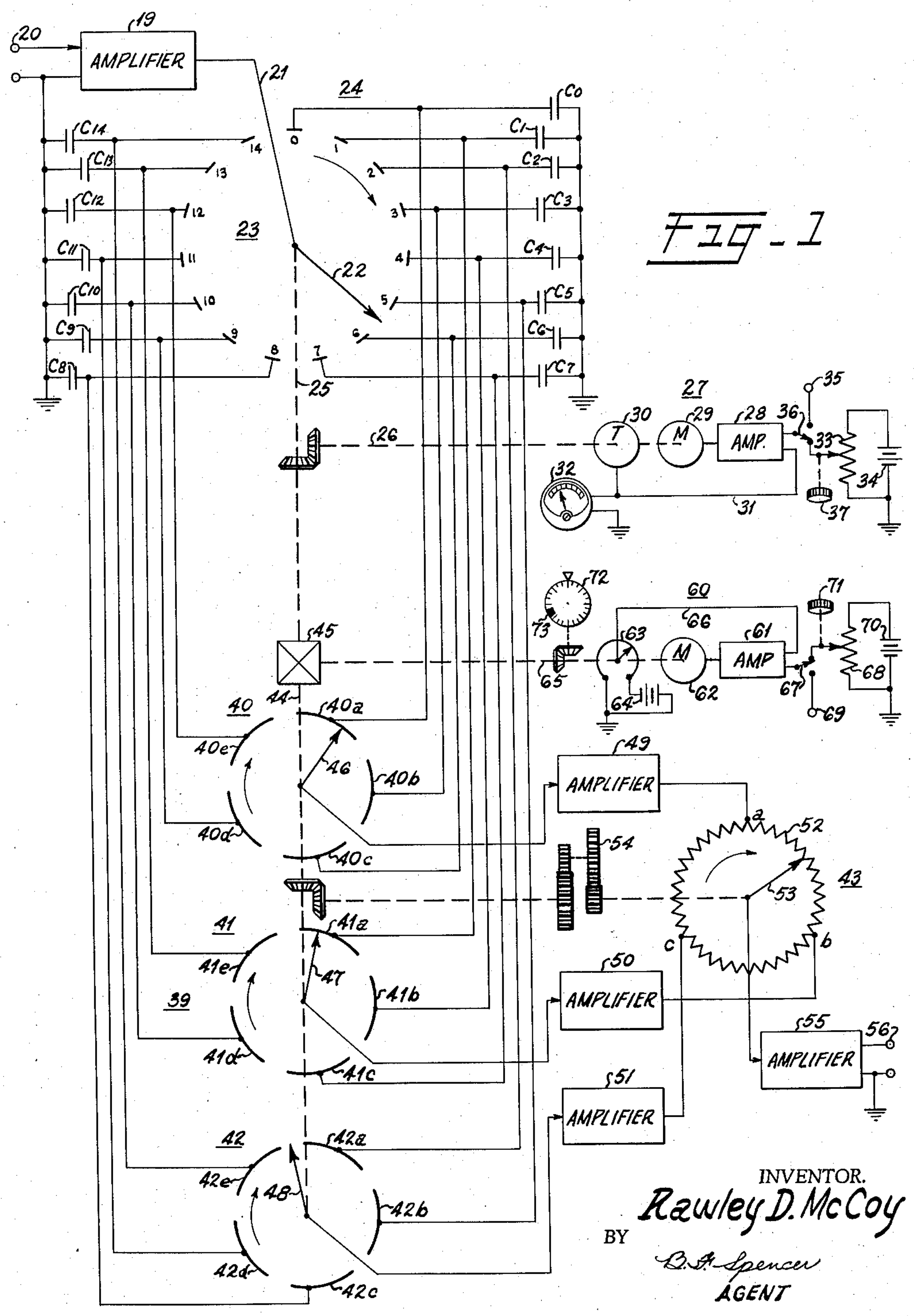

This invention relates to time-delay circuits and, in particular, to apparatus for delaying an applied input signal for a predetermined, controllable time interval.

One of the problems frequently encountered in the operation of an analog computer involves simulating the transport of a physical medium from one location to another. In the flow of fluid through a pipe, for example, a change in a spatially-defined parameter such as temperature or pressure at one point in the pipe will not be evident at another point until a relatively long interval of time has elapsed. The representation of a physical system of this type by an electrical analog requires apparatus capable of producing an accurate multi-second delay with a minimum of distortion in the output signal. In addition, other considerations, such as compressibility of the fluid, may make it desirable to provide means for varying the time delay in accordance with a given predetermined function.

A number of electronic networks and circuits based on converging mathematical series or direct network analysis have been developed for approximating the delay function. These circuits, however, have generally been limited to the introduction of relatively short delays of the order of one second or less or have achieved longer delays only at the expense of increased equipment complexity. Another known method involves sequentially impressing an input voltage upon a series of capacitors and then, after a delay, coupling the stored voltage to an output circuit. A stepped output voltage having a waveform which may be considerably different from that of the input signal is thus obtained. The waveform of the output voltage can be improved by passing it through a smoothing or integrating network, but a phase shift is thereby introduced which may significantly alter the overall time delay of the apparatus. The magnitude of this additional delay will vary with the frequency of the input signal thereby making direct calibration of the equipment impractical.

Accordingly, the principal object of this invention is to provide an improved time-delay apparatus.

Another object is to provide time-delay apparatus in which the waveform of the output signal conforms closely to that of the input signal.

Still another object is to provide simple and reliable time-delay apparatus in which the magnitude of the delay may be readily and accurately adjusted over an extremely wide range of values ranging from less than one second duration to hundreds of seconds.

Yet another object is to provide direct-reading time-delay apparatus which is compact in size and relatively inexpensive to construct.

A further object is to provide time-delay apparatus wherein the magnitude of the delay may be continuously and accurately varied in accordance with external signals.

The foregoing objects are achieved by this invention which comprises apparatus for sequentially impressing an input signal upon a plurality of storage units. After each signal component has been stored for a predetermined period of time it is read out of the storage unit and coupled to an interpolating device. The interpolating device provides an output voltage having a waveform which conforms closely to that of the input signal but which is delayed for a predetermined interval of time.

In one embodiment of the invention, a sampling switch, having a rotatable arm, sequentially couples an input signal to a plurality of capacitors thereby charging each capacitor to a voltage having a magnitude proportional to the instantaneous value of the input signal at the time it is coupled to the capacitor. A read-out unit is provided consisting of three read-out switches having rotatable arms affixed to the same shaft and mechanically coupled, through a differential mechanism, to a shaft driving the rotatable arm of the sampling switch. Each of the read-out switches has a stationary member divided into a series of insulated conductive segments. The number of segments on each read-out switch is equal to one-third the total number of capacitors, and adjacent segments on the same switch are permanently connected to every third capacitor in the storage unit.

The three rotatable arms on the read-out switches are electrically connected to three symmetrically spaced taps on the stator of a one-turn linear potentiometer. The rotor or arm of the potentiometer, which is geared to the read-out switch arms, travels between taps in substantially the same time as elapses between samplings of the input signal thereby providing an output voltage which reproduces the input signal waveform by a series of linear approximations. By means of the differential mechanism the angular positions of the read-out switch arms may be made to lag that of the sampling switch arm. With the sampling switch being driven at a fixed speed, the amount of delay obtained is directly proportional to the angle between the shafts driving the sampling and read-out arms, and this delay may be varied by adjustment of the differential setting. The delay period may be further controlled by varying the speed with which the sampling switch arm is driven. The total time delay obtained is directly proportional to the angle between the shafts and inversely proportional to the speed of the sampling switch.

Figure 2:
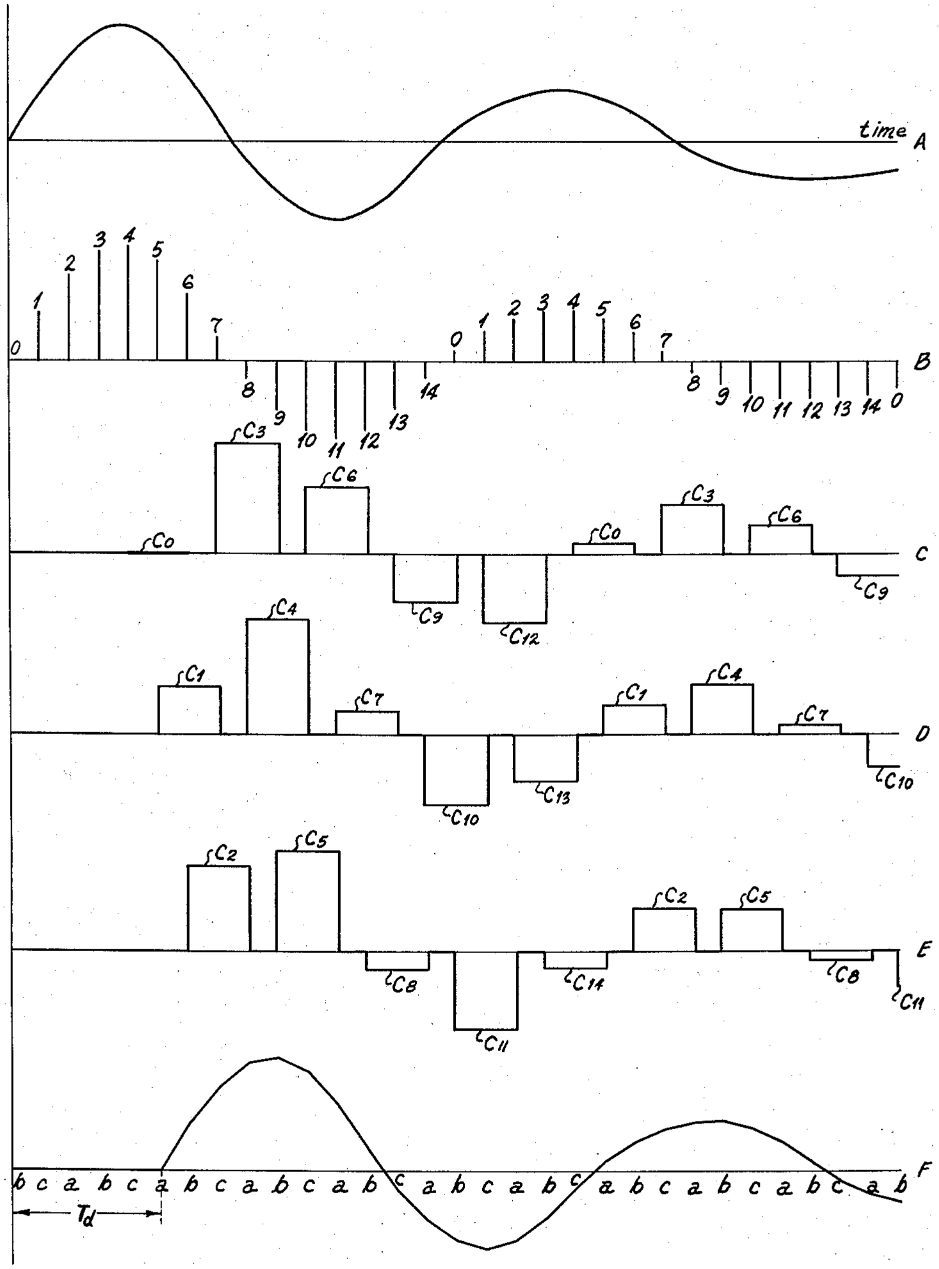

The above objects and the brief introduction to the present invention will be more fully understood and further objects and advantages will become apparent from a study of the following detailed description in connection with the drawings wherein:

Fig. 1 depicts schematically an embodiment of the time-delay apparatus in accordance with the invention, and Fig. 2 shows curves representing the voltage-time waveforms of signals occurring at various portions of the system of Fig. 1.

Referring to Fig. 1, there is shown an amplifier 19, having an input terminal 20, coupled by a lead 21 to the rotatable arm 22 of sampling switch 23. Sampling switch 23 is provided with 15 spaced conductive segments designated by the consecutive numerals 0–14, each segment being connected to one capacitor of a storage bank 24 comprising fifteen capacitors, $C_0$–$C_{14}$. One terminal of each of the capacitors is connected to ground while the other terminal is connected to an associated switch segment. Thus, capacitor $C_0$ is coupled to segment 0, capacitor $C_1$ is coupled to segment 1, . . . and capacitor $C_{14}$ to segment 14.

The rotatable sampling arm 22, affixed to sampling switch shaft 25, is driven in a clockwise direction through drive shaft 26 by rate servo 27, servo 27 including an amplifier 28 and a motor 29. A tachometer 30, mechanically coupled to motor 29, provides rate feedback to the input of amplifier 28 over lead 31 and, in addition, energizes voltmeter 32 to indicate the speed of rotation of drive shaft 26. Voltmeter 32 will provide a sufficiently accurate indication of the speed of shaft 26 for most applications of the present invention but, if more accurate information is required, other more precise methods of measuring the angular velocity of the shaft may be employed.

The angular velocity of rate servo 27 may be varied by adjusting the input voltage to amplifier 28. Selector switch 36 is provided for coupling either the arm of potentiometer 33 or terminal 35 to amplifier 28. Potentiometer 33, connected across voltage source 34, permits manual adjustment of speed by knob 37 while terminal 35 may be used to introduce an external control voltage to the amplifier.

A signal voltage applied between input terminal 20 and ground is sequentially coupled by sampling arm 22 to each of the conductive segments 0–14. As arm 22 contacts each conductive segment, the capacitor coupled to that segment is charged to the value of the output voltage of amplifier 19. Amplifier 19 has a very low output impedance and, therefore, the time required to charge the capacitors is negligible when compared with the time sampling arm 22 dwells on any one segment. Each of the capacitors $C_0$–$C_{14}$ retains its charge for almost one revolution of sampling arm 22, and acquires a new charge proportional to the instantaneous amplifier output voltage on each subsequent revolution when the capacitor is again coupled to the output of amplifier 19.

A read-out unit 39, including three read-out switches 40–42, and a linear potentiometer 43 are provided for transforming the voltages stored on capacitors $C_0$–$C_{14}$ into a delayed output voltage having substantially the same waveform as the input signal. Read-out switch shaft 44, coupled to sampling switch shaft 25 through a mechanical differential 45, drives read-out arms 46, 47, and 48 of read-out switches 40, 41 and 42 respectively in a clockwise direction. The stators of read-out switches 40–42 are identical, each consisting of five equally spaced conductive segments symmetrically disposed about shaft 44. Segments **40*a*–40*e* are connected to the ungrounded terminals of capacitors $C_0$, $C_3$, $C_6$, $C_9$, and $C_{12}$ respectively. Segments 41*a*–41*e* of switch 41 are connected to capacitors $C_1$, $C_4$, $C_7$, $C_{10}$, and $C_{13}$ respectively; while segments 42*a*–42*e* of switch 42 are connected to capacitors $C_2$, $C_5$, $C_8$, $C_{11}$, and $C_{14}$ respectively. Each of the conductive segments 40*a*–40*e*, 41*a*–41*e*, and 42*a*–42*e* has an arcuate length slightly exceeding 48°, the space between each segment being just less than 24°. Arm 47 of read-out switch 41 is arranged to lag arm 46 of read-out switch 40 by approximately 24° in a counterclockwise direction, while arm 48 lags arm 46** by about 48° in the same direction.

Read-out arms 46, 47, and 48 are coupled through suitable slip rings (not shown) to isolation amplifiers 49, 50, and 51 respectively. Each of the amplifiers 49–51 is designed to have substantially unity positive gain and a very high input impedance to prevent discharge of capacitors $C_0$–$C_{14}$ through the input circuits of the amplifiers.

Stator 52 of linear potentiometer 43 comprises a uniformly wound resistance element having symmetrically spaced taps *a*, *b*, and *c* coupled to the ouput of isolation amplifiers 49, 50 and 51 respectively. Potentiometer rotor 53 is mechanically coupled to read-out switch shaft 44 through a 5:1 gear train so that it makes five revolutions for each revolution of sampling arm 22 and read-out arms 46–48. An output amplifier 55 is connected through slip rings (not shown) to rotor 53 thereby providing an output voltage between terminal 56 and ground.

The interval of time delay between application of a signal to input terminal 20 and the appearance of a corresponding voltage at output terminal 56 is determined by the time between the charging of a capacitor and the coupling of that capacitor to linear potentiometer 43. When the angular velocity of rate servo 27 is held constant, this time delay interval is determined by the angle between shafts 25 and 44, sampling arm 22 and read-out arms 46–48 being rigidly secured to their respective shafts.

Differential 45 is adjusted by a conventional positional servo 60, servo 60 including an amplifier 61 connected to a motor 62. The arm of a feedback potentiometer 63, energized by voltage source 64, is coupled to the output shaft 65 of motor 62. The arm of potentiometer 63 is connected to the input of amplifier 61 by lead 66, the input voltage to amplifier 61 controlling the position of shaft 65. Selector switch 67 is provided for coupling either the arm of potentiometer 68 or terminal 69 to amplifier 61. Potentiometer 68, connected across voltage source 70, permits manual adjustment of the position of shaft 65 by knob 71 while terminal 69 may be used to introduce an external control voltage to the amplifier. Dial 72, geared to shaft 65, provides an indication of the setting of differential 45 and therefore, the angle between shafts 25 and 44. If, in a particular application, only manual control of time delay is required, positional servo 60 may be omitted and differential 45 controlled by a simple calibrated knob.

Dial 72 may be calibrated directly in seconds since the time delay obtained with the apparatus is directly proportional to the angle between shafts 25 and 44. The amount of delay that can be provided by adjustment of differential 45 varies between a small fraction of a second to almost the time elapsing during one revolution of the input shaft. For example, if rate servo 27 turns shafts 25 and 44 at a speed of one revolution per second, then mechanical differential 45 can be adjusted by positional servo 60 to provide a delay of almost one second. Accordingly, dial 72 may be linearly calibrated in units of time, one complete revolution of the dial corresponding to one second.

Zero time delay cannot be obtained by the apparatus of Fig. 1 since a finite time interval must elapse between the coupling of the input voltage to a capacitor and the read-out of that voltage. Similarly, a delay exactly equal in time to one revolution of shafts 25 and 44 is unobtainable. Time delays between zero and one second may be accurately set on calibrated dial 72. A "dead-zone" 73, marked on dial 72, indicates the region where the apparatus is not to be operated.

If the relative positions of shafts 25 and 44 are held constant, the time delay may be controlled by adjusting the sampling speed of rate servo 27. Increasing the sampling speed decreases the time delay proportionally, while decreasing the sampling speed increases the time delay. The variable time delay apparatus may be made direct reading by calibrating voltmeter 32 in terms of the reciprocal of the speed of servo 27 in revolutions per second. The time delay produced by the invention is then the reading of dial 72 in seconds multiplied by the reading of voltmeter 32. Thus, if positional servo control knob 71 is turned until dial 72 indicates a delay of ¾ of a second and rate servo control knob 37 is set for a multiplier reading on voltmeter 32 of four (corresponding to a speed of ¼ of a revolution per second) the total delay obtained will be ¾×4 or three seconds.

Referring now to Fig. 2, waveform A depicts the input voltage applied to terminal 20 as a function of time. The waveform of this voltage has been arbitrarily chosen as typical of one which might be applied to the apparatus of the invention, it being assumed that the input voltage commences at zero during the interval that sampling arm 22 is conductively engaging segment 0 of sampling switch 23. Phase shift through amplifier 19 is negligible and, therefore, the amplifier output voltage applied to sampling arm 22 is in phase with the input voltage and has a corresponding waveform.

Wave form B is a diagrammatic representation in which a series of vertical lines represent the magnitudes of the voltages impressed across each of the capacitors during two complete revolutions of sampling arm 22. The numeral identifying each vertical line denotes which of the conductive segments 0–14 arm 22 is contacting at that instant. The height of the line is proportional to the instantaneous input voltage and, therefore, to the voltage stored across the capacitor then coupled to the output of amplifier 19.

Waveforms C, D, and E represent the voltages applied to taps *a, b,* and *c* respectively of linear potentiometer 43. The height of each pulse is proportional to the voltage present across one of the capacitors $C_0$–$C_{14}$, the width of the pulse represents the time interval during which the capacitor is coupled to a tap on linear potentiometer 43 through one of the rotating read-out arms 46–48, and the interval between pulses corresponds to the time required for the read-out arm to travel between two adjacent conductive segments on the read-out switch stator. Each pulse has been identified by the symbol designating the capacitor producing it.

Waveform F illustrates the voltage between rotor 53 of linear potentiometer 43 and ground plotted as a function of time. The output voltage appearing between terminal 56 and ground has a corresponding waveform, amplifier 55 being used for isolation only. The rotor voltage of waveform F, which is delayed with respect to the input voltage of waveform A for an interval of time $T_d$, is composed of a series of linear segments having their junctions identified by the letters *a, b,* and *c* corresponding to the particular tap on potentiometer stator 52 which rotor 53 is then engaging. Potentiometer 43, therefore, interpolates between the voltages applied to each of the taps. The linear segments produced provide a close approximation to the waveform of the input signal as can be seen by comparison of waveforms A and F.

With all capacitors $C_0$–$C_{14}$ discharged, the input voltage of waveform A is applied to terminal 20 as sampling arm 22 traverses conductive segment 0. Since the signal voltage is initially zero, capacitor $C_0$ will not be charged and the voltage across it remains at zero. As arm 22 is rotated clockwise, capacitors $C_1$, $C_2$, $C_3$ and $C_4$ are charged in that order to the voltages indicated by waveform B. During this interval no voltage is present at taps *a, b,* or *c* because the particular capacitors coupled to the taps through read-out switches 40–42 remain uncharged.

As read-out arm 47 contacts the leading edge of conductive segment 41*a*, the voltage across capacitor $C_1$ is coupled through isolation amplifier 50 to tap *b* on stator 52 of interpolating potentiometer 43. At this instant rotor 53 is approaching tap *a*, tap *a* being at zero potential because there is zero charge on capacitor $C_0$. As rotor 53 rotates toward tap *b*, its potential increases linearly as shown in waveform F until, when it reaches tap *b*, the rotor voltage equals the voltage across capacitor $C_1$.

Fig. 1 illustrates the positions of the switch arms and potentiometer rotor during this interval. Rotor 53 is midway between taps *a* and *b*, sampling switch arm 22 is between conductive segments 5 and 6, read-out arms 46 and 47 are coupling capacitors $C_0$ and $C_1$ to taps *a* and *b* respectively, and read-out arm 48 is traversing the gap between segments 42*e* and 42*a*. Rate servo 27 is rotating shafts 25 and 44 at constant speed and the angular displacement between the shafts is held fixed by positional servo 60 to produce the desired time delay $T_d$.

As rotor 53 approaches tap *b*, read-out arm 48 contacts segment 42*a* on read-out switch 42 thereby coupling the voltage across capacitor $C_2$ to tap *c*. The voltage on rotor 53 linearly increases, therefore, as the rotor moves from tap *b* to tap *c* from the voltage across capacitor $C_1$ to the voltage across capacitor $C_2$. When rotor 53 is midway between taps *b* and *c*, read-out arm 46 is traversing the gap between segments 40*a* and 40*b*. Capacitor $C_3$ is coupled to tap *a* through segment 40*b* before rotor 53 has reached tap *c*.

The voltage on rotor 53 continues to increase as shown in waveform F as the rotor moves from tap *c* to tap *a* while read-out arm 47 leaves segment 41*a* and engages segment 41*b*. Thus, tap *b* is switched while rotor 53 is moving between taps *c* and *a* and, as can be seen by inspection of Fig. 1 and waveforms C, D and E, the voltage on each of the other stator taps is switched while rotor 53 is traveling between the adjacent taps. Two complete revolutions of sampling arm 22 (and read-out arms 46–48) are shown in Fig. 2, the remainder of the output voltage being derived in a similar manner. Rotor 53 makes five complete revolutions for each revolution of the three read-out arms 46–48 thereby providing linear interpolation between each of the fifteen capacitor voltages.

The time delay $T_d$ between the input and output voltages may be altered by adjusting the setting of differential 45 thereby varying the angular displacement between shafts 25 and 44. This may be accomplished while the equipment is in operation by changing the setting of potentiometer 68 manually or by applying a control signal to terminal 69 from an external source.

The delay may also be varied by changing the speed of rate servo 27 either by adjustment of potentiometer 33 or by introduction of an external control signal to terminal 35. Varying the delay by adjustment of rate servo 27 also alters the sampling speed, thereby changing the number of capacitors charged during each cycle of the input signal.

The fidelity with which the input signal can be reproduced is determined by the highest frequency component in the input signal, the number of capacitors in the storage bank 24, and the sampling speed. With the number of capacitors fixed, decreasing the sampling speed to increase the total time delay results in fewer capacitors being charged during one cycle of the signal thereby limiting the maximum input frequency that can be accurately reproduced. Adjustment of time delay by use of positional servo 60 is independent of input frequency since the sampling speed is unaffected.

Where the frequency of the input signal and the desired time delay interval $T_d$ are known in advance, the optimum fidelity with which the input signal can be reproduced is obtained by selecting a sampling speed such that all fifteen condensers are used within the known time delay interval. For example, if the desired time delay interval of waveform A were to be one-half cycle, a sampling speed selected such that all fifteen condensers would be charged within the half-cycle would produce the optimum fidelity of the delayed output voltage.

In order to simplify the drawings, only fifteen capacitors have been shown comprising storage bank 24 in Fig. 1. The use of additional capacitors may be found desirable if the input frequency that can be faithfully reproduced with a given time delay must be increased. If the number of capacitors is made larger, the number of conductive segments on sampling switch 23 and the three read-out switches 40–42 must be increased proportionately as must the ratio of gear train 54.

One of the significant features of this invention is that it provides a delayed output voltage having a waveform which conforms closely to the input signal. The output voltage may be precisely and simply adjusted to provide a time delay ranging from less than one second to hundreds of seconds and this delay may be a function of time or some other variable. Another feature is the providing of a direct reading time delay system which interpolates between discrete samples of the input voltage without introducing any additional delay.

As many changes could be made in the above construction and many different embodiments of this invention could be made without departing from the scope thereof, it is intended that all matter contained in the above description or shown in the accompanying drawing shall be interpreted as illustrative and not in a limiting sense.

What is claimed is:

1. Time delay apparatus comprising storage means including a plurality of storage elements, sampling means having first and second sampling elements movable with respect to each other, said first sampling element being adapted for receiving an input signal and said second sampling element including a plurality of insulated conductive segments each coupled to one of said storage elements, interpolating means including a plurality of series-connected impedance elements, a plurality of read-out switches having first and second read-out switch elements movable with respect to each other, each of said first read-out switch elements including a plurality of insulated conductive segments each coupled to one of said storage elements and each of said second read-out switch elements being coupled to a corresponding junction between two of said series-connected impedance elements, and output means adapted for conductive engagement with said impedance elements, said output means being coupled to said read-out switches.

2. Time delay apparatus as defined in claim 1 wherein said apparatus further comprises differential means coupling said sampling means and said read-out switches, said differential means permitting adjustment of said read-out switches relative to said sampling means.

3. Time delay apparatus comprising storage means including a plurality of capacitors, sampling means having a movable element adapted for receiving an input signal and a second element including a plurality of insulated conductive segments each coupled to one of said plurality of capacitors, interpolating means including a linear impedance element having a plurality of taps thereon and further including movable output means arranged for conductive engagement with said impedance element, a plurality of read-out switches, each having a movable element coupled to an associated tap on said impedance element and a second element including a plurality of insulated conductive segments each connected to one of said capacitors, first mechanical connecting means for coupling each of the movable elements of said read-out switches to the movable element of said sampling means, and second mechanical connecting means for coupling said output means to the movable elements of said read-out switches.

4. Time delay apparatus as defined in claim 3 wherein said first mechanical connecting means comprises differential means for varying the position of the movable elements of said read-out switches and said output means with respect to the movable element of said sampling means.

5. Time delay apparatus as defined in claim 3 wherein said linear impedance element has three symmetrically spaced taps thereon and said plurality of read-out switches includes three read-out switches each having its movable element coupled to a corresponding tap on said linear impedance element.

6. Time delay apparatus as defined in claim 3 wherein said apparatus further comprises variable speed driving means coupled to the movable element of said sampling means.

7. Variable time delay apparatus comprising in combination, a rotary sampling switch having a conductive sampling arm and a plurality of stationary conductive segments insulated from each other, a plurality of storage elements coupled respectively between said plurality of conductive segments and a common terminal, means adapted for coupling an applied input voltage between said sampling arm and said common terminal, a continuously rotatable impedance unit having a stationary circular impedance element and a rotor arm conductively engaging said circular impedance element, said circular impedance element having a plurality of equi-spaced taps thereon, means mechanically intercoupling said sampling arm and said rotor arm, said mechanical coupling means driving said rotor arm between adjacent taps on said impedance element during the time interval that said sampling arm is being driven from one segment to an adjacent segment, and rotary switching means mechanically coupled to said rotor arm, said rotary switching means electrically coupling each of said storage elements in sequence to corresponding taps on said impedance element, the output voltage between said rotor arm and said common terminal being delayed in time relative to said applied input voltage.

8. Variable time delay apparatus comprising in combination a sampling switch having a rotatable arm and a plurality of stationary conductive segments insulated from each other, a pair of input terminals for receiving an applied voltage to be delayed, means electrically coupling one of said input terminals to said rotatable arm, a storage element coupled from each of said stationary conductive segments to said other input terminal, first shaft means mechanically coupled to said rotatable arm for successively coupling said arm to each of said stationary conductive segments, an interpolating means having a linear impedance element with a plurality of taps thereon, said interpolating means further including a continuously rotatable wiper engaging said linear impedance element, means electrically coupling each of said plurality of stationary conductive segments of said sampling switch to corresponding taps on said linear impedance element, second shaft means mechanically coupled to said rotatable wiper, means mechanically coupling said second shaft means to said first shaft means, means coupled to one of said shaft means for continuously rotating said arm and said wiper, a pair of output terminals, one of said output terminals being coupled to said other input terminal, and means electrically coupling said rotatable wiper to said other output terminal.

9. The variable time delay apparatus as defined by claim 8 wherein said means electrically coupling said one input terminal to said rotatable arm includes an amplifier means and wherein said means electrically coupling said rotatable wiper to said other output terminal includes an amplifier means.

10. The variable time delay apparatus as defined by claim 8 wherein said means mechanically coupled to one of said shaft means for continuously rotating said arm and said wiper includes means for indicating the time interval per revolution of said first shaft means.

11. The variable time delay apparatus as defined by claim 8 wherein said means mechanically coupling said second shaft means to said first shaft means includes a differential, and means coupled to said differential for adjusting the relative angular displacement between said first and second shaft means.

12. The variable time delay apparatus as defined by claim 11 further comprising indicating means coupled to said means for adjusting the relative angular displacement between said first and second shaft means, said indicating means indicating the angular displacement between said first and second shaft means.

13. The variable time delay apparatus as defined by claim 8 wherein said means electrically coupling each of said plurality of stationary conductive segments of said sampling switch to corresponding taps on said linear impedance element includes a plurality of read-out switches, each of said read-out switches having a movable element and a plurality of conductive segments insulated from each other, means electrically coupling each of said movable elements to an associated tap on said linear impedance element, each of said plurality of conductive segments of said read-out switches being coupled to a corresponding conductive segment of said sampling switch, and means mechanically coupling the movable elements of said read-out switches to one of said shaft means.

14. The variable time delay apparatus as defined by claim 13 wherein said means electrically coupling each of said movable elements to an associated tap on said linear impedance element includes isolation amplifier means.

15. Direct reading variable time delay apparatus comprising in combination a sampling switch having a rotatable arm and a plurality of stationary conductive segments insulated from each other, a pair of input terminals for receiving an applied voltage to be delayed, amplifier means coupling one of said input terminals to said rotatable arm, a storage element coupled from each of said stationary conductive segments to said other input terminal, first shaft means mechanically coupled to said rotatable arm for successively coupling said arm to each of said stationary conductive segments, three read-out switches each having a movable element and a plurality of conductive segments insulated from each other, differential means mechanically coupling said first shaft means to the movable elements of said read-out switches, means coupling each of the conductive segments of said three read-out switches to corresponding conductive segments of said sampling switch, a potentiometer including a closed loop linear impedance element having three equi-spaced taps therein and a rotatable wiper engaging said linear impedance element, first, second and third isolation amplifier means coupled respectively from the movable elements of said three read-out switches to said three equi-spaced taps on said linear impedance element, second shaft means mechanically coupling the rotatable wiper of said potentiometer to said three movable elements of said read-out switches, a pair of output terminals, one of said output terminals being coupled to said other input terminal, amplifier means coupling said rotatable wiper to said other output terminal, and indicator means coupled to said differential means for indicating the angular displacement between said first shaft means and the movable elements of said three read-out switches, the relative angular displacement between said first shaft means and said movable elements being proportional to the time delay of an output voltage appearing at said pair of output terminals relative to an applied voltage coupled to said pair of input terminals.

References Cited in the file of this patent

UNITED STATES PATENTS

| | | |
|---|---|---|
| 1,851,092 | Fetter | Mar. 29, 1932 |
| 2,006,582 | Callahan et al. | July 2, 1935 |
| 2,431,023 | Browne et al. | Nov. 18, 1947 |
| 2,489,263 | Busignies | Nov. 29, 1949 |
| 2,889,538 | Geisler | June 2, 1959 |